United States Patent [19]

Gaines

[11] 4,142,909

[45] Mar. 6, 1979

[54] METHOD AND COMPOSITION FOR CONTROLLING CONTRACTION IN SETTING CEMENTITIOUS SYSTEMS THROUGH THE ADDITION OF GAS GENERATING AGENTS

[75] Inventor: Robert W. Gaines, Darien, Conn.

[73] Assignee: Construction Products Research, Inc., Old Greenwich, Conn.

[21] Appl. No.: 612,239

[22] Filed: Sep. 11, 1975

[51] Int. Cl.$^2$ ............................................. C04B 1/00
[52] U.S. Cl. ........................................ 106/87; 106/89; 106/90; 106/104; 106/109; 106/110; 106/111; 106/118; 106/119; 106/122
[58] Field of Search ................... 106/86, 87, 104, 109, 106/110, 111, 118, 119, 122, 89, 90

[56] References Cited

U.S. PATENT DOCUMENTS

| | | | |
|---|---|---|---|
| 2,626,933 | 1/1953 | Lober | 106/122 |
| 2,930,771 | 3/1960 | Wade | 106/87 |
| 3,062,669 | 11/1962 | Dilnot | 106/87 |
| 3,330,675 | 7/1967 | Magder | 106/87 |
| 3,591,394 | 7/1971 | Diggelmann et al. | 106/87 |
| 3,608,060 | 9/1971 | Osment et al. | 106/87 |
| 3,625,724 | 12/1971 | Alvero | 106/87 |
| 3,794,504 | 2/1974 | Babcock | 106/87 |

OTHER PUBLICATIONS

The Condensed Chemical Dictionary; 8th ed., Van Nostrand Reinhold Co., 1968, p. 192.
The American College Dictionary; Random House Inc., 1970, p. 194.
The Merck Index; 8th ed., Merck & Co. Inc., 1968, p. 955.
The Condensed Chemical Dictionary; 8th ed., Van Nostrand Reinhold Co. 1968 p. 87.

*Primary Examiner*—L. Dewayne Rutledge
*Assistant Examiner*—John P. Sheehan
*Attorney, Agent, or Firm*—Alphonse R. Noe

[57] ABSTRACT

The contraction of aqueous hydraulic cement mixtures is controlled by the addition thereto of a gas generating agent capable of generating gas in the mixture without the addition of activators or other agents. Gas generation may be controlled over an extended period of time so that even slow setting cementitious mixtures may have their shrinkage or contraction inhibited during setting and hardening.

10 Claims, No Drawings

METHOD AND COMPOSITION FOR CONTROLLING CONTRACTION IN SETTING CEMENTITIOUS SYSTEMS THROUGH THE ADDITION OF GAS GENERATING AGENTS

BACKGROUND OF THE INVENTION

1. Field of the Invention

This invention relates to an improved method and composition for inhibiting shrinkage in cementitious systems during setting and hardening and, more particularly, to a method and composition for controlling the contraction of such cementitious systems through the addition of gas generating agent additives.

The term "cementitious systems," as used herein, is intended to include compositions which generally possess the characteristic of hardening under water and includes, for example, settable hydraulic cement, hydraulic lime, gypsum and like materials, as well as mixtures of the foregoing with aggregates and water such as concrete, mortar, grout and products made therefrom.

2. Description of the Prior Art

Various methods and means for inhibiting shrinkage of hydraulic cement mixtures during setting and hardening have previously been suggested. These methods have included the addition, to such mixtures, of gas delivering agents such as aluminum powder and expansion agents such as iron filings. These procedures have been impractical because of, among other reasons, lack of adequate control of expansion and production of a non-uniform product. It has also been found that certain unique materials can eliminate shrinkage in concrete due, it is theorized, to the release of entrapped gas from porous particulate materials upon adsorption of water from the cementitious system. Thus, materials such as fluid coke, a combination of fluid coke and delayed coke, which are byproducts of the petroleum industry, and porous particulate materials, such as so called industrial adsorbents, have been used with various types of cementitious mixtures to successfully inhibit shrinkage. See for example U.S. Pat. Nos. 3,503,767; 3,519,449; 3,794,504; 3,890,157; and Re. 26,597.

U.S. Pat. No. 3,591,394 describes the drawbacks associated with the usual gas delivering and expansion compositions involving metal powders when added to cement to compensate shrinkage. The patent proposes the use of a nitrogen delivering compound which produces an expansion or formation of pores in the concrete material and states that while nitrogen delivering compounds have been used in expanding agents for rubber products such has been accomplished at high temperatures only. Nevertheless, U.S. Pat. No. 3,591,394 requires the addition, to concrete, of an activator together with a nitrogen delivering hydrazine derivative or diazonium compound to chemically cleave off nitrogen. Not only does the need for an activator introduce another constituent to be supervised and the difficulties attendant therewith but it is believed that certain activators can have a deleterious effect on the cement mixture. For example, soluble borates may retard cement set and lower its strength and great care is necessary in using retardant since setting and hardening of cement can be totally inhibited thereby. Thus, the use of a perborate activator may present drawbacks.

In addition, I have found that the use of a hydrazine derivative such as benzene sulfonyl hydrazide either does not produce expansion without an activator or produces an expansion which fades before setting occurs so that the cement sags below placement volume before setting, when measured by the ASTM method of test for early volume change of cementitious mixtures, ASTM C827.

The use of hydrogen peroxide or sodium peroxide to foam concrete is attendant with the same drawbacks arising from the use of metal powders; namely, a lack of effective control due to almost immediate reaction to generate gas.

The foregoing demonstrate that the successful utilization of certain materials as shrinkage inhibitors to control contraction in setting cementitious systems is unpredictable. For example, fluid coke is a carbonaceous material and therefore its success as a shrinkage inhibitor without having deleterious effects on the cementitious system is surprising in view of the general attitude of the art that such materials should not be added to concrete. Also, the expansion arising from metal additives is largely uncontrollable so as to prevent their effective utilization where control, produce uniformity and repeatability of results is desired. In addition, U.S. Pat. No. 3,591,394 demonstrates that, while expanding agents may be known to be used in one industry, for example, in the plastics industry as expanding agents for rubber products, the parameters of operation in different industrial fields of application are frequently of such difference that one would not be led to believe that additive constituents would be interchangeable in the two.

SUMMARY OF THE INVENTION

I have found that, advantageously, certain blowing agents can function as additives in cementitious systems and that when added to such systems they controllably inhibit the shrinkage or contraction that normally occurs upon setting and hardening. In particular, I have found that certain selected organic as well as inorganic blowing agents can accomplish this result with improved control and without the need for the simultaneous addition of activating compounds to enable the formation or evolution of gas so that disadvantages associated with such activators are eliminated.

Thus, according to this invention, nitrogen forming chemicals such as azodicarbonamide, sodium azodicarboxylate and p-toluene sulfonyl hydrazide as well as organic peroxides and sodium borohydride possess advantageous characteristics useful for shrinkage inhibition and control of contraction of cementitious systems during setting and hardening without the need for specific temperature control or addition of activating agents.

The effectiveness of the aforementioned compounds is surprising in that they apparently behave differently within the cementitious system environment than would be expected from their behavior under other circumstances. For example, sodium azodicarboxylate reacts with plain water with a rapid gas generation so that ebullition is complete in approximately ten minutes and clear solution results with no further effervescence. Yet, in the cementitious system environment I have found that gas evolution can be prolonged so that volume contraction and resultant shrinkage compensation may be continued for over five hours.

The azodicarbonamide has been found to be particularly effective since shrinkage of the cementitious material may be prevented during the entire period while the material is hardening. In contrast to the rapid gas evolution arising from inorganic peroxides, and thus effective only for early compensation of setting shrinkage, an organic peroxide such as methyl ethyl ketone peroxide dissolved in dimethyl pthalate liberates oxygen in an effective way in the cementitious environment to provide control of the setting contraction for a longer period of time. Thus, although such peroxide is normally insoluble in water, it surprisingly disperses in the cementitious mix when added thereto as the aforementioned solution and liberates oxygen to compensate for the shrinkage. While sodium borohydride is a hydrogen generator as is aluminum powder, advantageously it affords a predictable gas release in cementitious systems in contrast to the variable behavior of aluminum powder.

The precise manner in which the compositions disclosed herein function effectively in cementitious systems to inhibit shrinkage and control contraction, whether physical or chemical, is not fully understood and need not be. Although it is theorized, and I do not wish to be bound thereby, that greater control is achieved due to the behavior of the compositions in accordance with the principles of solubility, it is sufficient to point out that the additive materials operate successfully in the manner disclosed herein with the results being measured according to the ASTM method of test for early volume change of cementitious mixtures, ASTM C827. It is also believed that the decomposition of the additive constituents to generate gas is different, either physically or chemically, in cementitious systems than when the same are used in plastic environments so that unexpectedly a different nature of control is achieved.

Therefore, a feature of this invention is the provision of a method and composition for inhibiting shrinkage in cementitious systems through control of the contraction of such systems during setting and hardening by the addition of additives capable of forming gas.

A further feature of this invention is the provision of a method and composition which enables control of shrinkage of a cementitious system during its entire setting and hardening. A yet another feature of this invention is the provision of a method and composition for generating gas in cementitious systems and obtaining improved control of the nature of the gas generation and its duration.

DESCRIPTION OF THE PREFERRED EMBODIMENTS

Azodicarbonamide has been known as a blowing agent for plastics. Commercially available under the tradename "Celogen AZ" from Uniroyal, Inc., Naugatuck, Connecticut, the chemical is prepared by reacting hydrazine with urea under controlled conditions to produce the intermediate hydrazodicarbonamide which is oxidized to azodicarbonamide. Azodicarbonamide, also known as azobisformamide, is a yellow crystalline solid which decomposes to produce a high yield of gas (220-240 cc per gram STP). It does not support combustion and is self-extinguishing. The white decomposition residue is odorless, nontoxic, nondiscoloring and nonstaining. When used in the expansion of rubber and plastics, the dry decomposition temperature of 195°-216° C. is lowered by a variety of activators. A product bulletin, "Blowing Agents," by Dr. Bryan A. Hunter available from Uniroyal Chemical, Division of Uniroyal, Inc., Naugatuck, Connecticut discloses the decomposition gases as being primarily a mixture of nitrogen, carbon monoxide and a small amount of ammonia and carbon dioxide and suggests that primary decomposition of azodicarbonamide can follow more than one course.

Although stated, in the aforementioned "Blowing Agents," to be similar to benzene sulfonyl hydrazide, p-toluene sulfonyl hydrazide has a higher melting point and decomposition temperature, 120° C. and up, and yet is advantageously useful in the present invention whereas the former is not effectively useful in cement without an activator. The agent may be prepared by reacting toluene sulfonyl chloride with hydrazine in the presence of a base. It is available from Uniroyal under the tradename "Celogen TSH."

Sodium azodicarboxylate is a salt of azodicarboxylic acid which is available developmentally from Uniroyal and may be prepared by the neutralization of azodicarboxylic acid in the presence of sodium hydroxide. It is a crystalline solid which decomposes at high temperatures, in excess of 200° C., to produce nitrogen, carbon monoxide and sodium carbonate.

The methyl ethyl ketone peroxide suitable for use in this invention is a colorless solution in dimethyl phthalate obtainable under the trademark "Norox MEKP" available from the Norac Company, Inc., Azusa, California. While soluble in oxygenated organic solvents, it is only slightly soluble in water. Sodium borohydride is commercially available in dry powder or pellet form or as a stabilized water solution from Ventron Corporation, Beverly, Massachusetts.

In carrying out this invention, the proper amount of gas generating additive may be added to and mixed with cement or any type of cement mixture at any time prior to or during the addition of water to form aqueous cement mixtures except that the methyl ethyl ketone peroxide must be added at the time of formation of the aqueous mixture. For example, in preparing grout or mortar, the dry additive may be mixed with cement or cement and fine aggregates to form a dry cement mixture which is subsequently mixed with the desired amount of water to form grout or mortar. Similarly, in preparing ready mixed concrete, the additive may be mixed with the cement and aggregates to form a dry mixture which is then used to form the ready mixed concrete either in a stationary or in a truck mixer. On the other hand, it may also be advantageous to mix all the ingredients, including the additive, in the stationary and/or in the truck mixer to form the ready mixed concrete.

Since the amount of additive to be used in any cementitious system can be best calculated based on the amount of cement in the system, it is advantageous to incorporate the additive directly in the cement prior to its shipment to the user.

The following specific examples further illustrate the invention. In these examples, the performance of the additive is judged by the expansion and contraction of the cementitious system as soon as it was mixed with water and cast in a cylindrical mold in a 3½ inch deep casting with approximately 10 percent of exposed surface. The expansion of the cast was determined by the vertical movement of the top surface. For the purpose of higher accuracy, a light test, approved in June, 1975 as ASTM C827 for "Method of Test For Early Volume Change of Cementitious Mixtures," was used to measure the movement of the top surface. The test consists of using a focused light beam to project a shadow of the top surface onto a screen equipped with vertical graduations in "inch" units. The magnification is 88 times. The movement of the top surface on the screen is recorded in inches at frequent intervals for each cast until final set, which usually takes from 3 to 5 hours with longer setting materials and less than 60 minutes with a fast setting cementitious composition. The percent expansion is obtained by dividing the inches read off the graduated chart by 3½ and by 88 and by multiplying the results by 100.

A thin layer of oil or a seal such as Thompson's water seal is maintained on top of the cast cementitious material to prevent evaporation for setting under a "no evaporation" condition. To facilitate the detection of the movement of the top surface, a sphere was placed on top of the surface and the expansion or contraction of the cast was determined by the movement of the apex of the shadow projected on the screen.

EXAMPLE 1

A cementitious system corresponding to a typical grout composition was prepared by mixing 200 grams graded river sand, 200 grams of Type III cement and 89 grams of water. After thorough mixing, the composition was cast as described above and the expansion or contraction observed. Without the addition of any shrinkage compensating additive or gas generating agent there was a shrinkage observed, using the light test described above, of −4.5 inches.

EXAMPLE 2

To the cementitious system of Example 1 was added 0.05 percent, by weight of sand plus cement, azodicarbonamide. After casting and observation as described above, it was seen that shrinkage of the cementitious material was prevented during the entire period while the material was hardening so that the volume of the casting, as measured by the light test, continually increased until the casting was hard. Between the fourth and fifth hour, the casting volume remained constant and readings one day after first casting were equal to the fifth hour value which was +8 inches. Although growth of the casting is most effective at room temperature of approximately 70° F., positive growth of 0.7 inches after five hours was observed, even at a low temperature of 35° F. Substantial shrinkage inhibition, i.e. zero growth or partial reduction of shrinkage, is obtainable with additive concentrations as low as 0.002 percent. Amounts of 0.1 percent were also successful. Higher concentrations may be employed to advantage where it is desired to produce light-weight concrete.

EXAMPLE 3

To the cementitious system of Example 1 was added 0.05 percent, by weight of sand plus cement, p-toluene sulfonyl hydrazide which was cast and observed as described above. At hardening, a contraction of only −0.8 inches was observed, a significant improvement compared to the contraction of −4.5 inches when no additive is utilized. A run was made with the amount of additive doubled and an expansion, at hardening, of +0.5 inches was observed.

EXAMPLE 4

A cementitious composition was prepared by adding 168 grams Type III cement to 232 grams graded river sand and 70 grams of water to yield a mix of fluidity nearly equal to that of the previous examples. To this was added 0.05 percent, by weight of sand plus cement, sodium azodicarboxylate and the material was cast and observed as before. Shrinkage compensation was observed continuously for over 5 hours with an expansion of +7 inches seen at the fifth hour. After 5 hours and before the final set, a volume contraction of 0.5 inches occurred; however, it is apparent that if acceleration had been brought about prior to the fifth hour to obtain setting during the expansion period the full expansion would have been realized. Without the presence of the additive the shrinkage observed was −4 inches.

EXAMPLE 5

To a cementitious composition, sand-cement-water premixed base, such as that of Example 4, was added methyl ethyl ketone peroxide (60 percent MEK peroxide in dimethyl pthalate) in the amount of 0.1 percent, by weight of sand plus cement. At 5 hours, an expansion of approximately +3.6 inches was observed. As with the sodium azodicarboxylate, a small volume contraction of approximately −0.3 inches occurred after the fifth hour before final set.

The observed expansion or shrinkage compensation of the materials of Examples 2, 3 and 4 shows a fairly straight line expansion with time so that control may be readily achieved through selection of material, amount and by control of the set time of the cementitious system. The expansion of the material of Example 5 followed a smooth curve so that control may also be achieved without difficulty. The most significant aspect of control of the present invention is that the gas generation is not immediate but rather is generated over a period of time without exhausting itself prior to set or by rapid irregular generation resulting in the formation of the imperfect cast material. It should be recognized that the present invention advantageously enables the generation of gas within a cementitious system without the need for adding activators in addition to the gas forming agent.

It should be noted that not all organic gas forming agents can be successfully utilized to control the contraction of shrinkage prone cementitious systems. For example, 4, 4' -oxybis (benzenesulfonhydrazide), available under the tradename "Nitropore OBSH" from Stepan Chemical Company, Wilmington, Massachusetts demonstrated virtually no ability to inhibit the shrinkage of the cementitious system when used in a manner described above. Nor did "Expandex OX-5 PT," a blowing agent available from Stepan Chemical Company and yielding nitrogen and substituted heterocyclic compounds, upon decomposition.

An inorganic hydrogen gas generating additive has also been found to possess the desired characteristic of effective, controllable shrinkage inhibition in cementitious systems.

EXAMPLE 6

Sodium borohydride, in the amount of 2 grams, was added to a cementitious composition such as that of Example 1. After casting as described above, it was observed that an expansion of +4 inches occured to the point of Vicat set. This was followed by a slight contraction of 0.7 inches in the period between 3.5 to 6.5 hours after casting. A curve drawn through the plotted points of growth observed at various times after casting is smooth and indicates predictable controllability. By contrast the hydrogen gas generator, aluminum powder, is uncontrollable especially exhibiting highly variable behavior at different temperatures, such as shrinkage at 35° F. and nearly double the growth at 90° F. than at 70° F.

I claim:

1. A method of controlling contraction of hydraulic cementitious systems during setting and hardening comprising adding to the system a gas generating organic agent having a normal thermal decomposition temperature above the temperatures encountered during the setting and hardening of the hydraulic cementitious system, without activators, capable of chemically generating gas in the system during setting and hardening when liquid for setting and hardening is present therein without the addition of activating agent additives and without specific temperature control other than the ordinary ambient temperature conditions of setting and hardening being necessary for gas generation in an amount effective to counteract the contraction tendency of the cementitious system.

2. A method as claimed in claim 1 wherein the gas generating organic agent is methyl ethyl ketone peroxide dissolved in an nonaqueous solvent.

3. A method as claimed in claim 1 wherein the gas generating organic agent is one selected from the group consisting of azodicarbonamide, sodium azodicarboxylate and p-toluene sulfonyl hydrazide.

4. A method as claimed in claim 3 wherein the effective amount is 0.002–0.1 percent of additive by weight based on the cementitious system nonaqueous constituents.

5. A method as claimed in claim 1 wherein the gas is capable of being generated for a period of at least 5 hours.

6. A cementitious composition which, when mixed with water, is capable of setting into a hard mass without substantial shrinkage during setting and hardening comprising a hydraulic cement mixture and a gas generating organic agent having a normal thermal decomposition temperature above the temperatures encountered during the setting and hardening of the hydraulic cementitious system, without activators, capable of chemically generating gas in the presence of hydraulic cement and water during setting and hardening without the presence of other constituents and without specific temperature control other than the ordinary ambient temperature conditions of setting and hardening being necessary for gas generation in an amount effective to counteract the shrinkage tendency of the cementitious composition.

7. A cementitious composition as claimed in claim 6 wherein the gas generating organic agent is methyl ethyl ketone peroxide dissolved in an nonaqueous solvent.

8. A cementitious composition as claimed in claim 6 wherein the gas generating organic agent is one selected from the group consisting of axodicarbonamide, sodium azodicarboxylate and p-toluene sulfonyl hydrazide.

9. A method of controlling contraction of hydraulic cementitious systems during setting and hardening comprising adding thereto a hydrogen gas generating agent which is capable of controllably generating hydrogen gas to predictably inhibit shrinkage of the system without specific temperature control other than the ordinary ambient temperature conditions of setting and hardening being necessary for gas generation, the agent consisting of sodium borohydride in an amount effective to counteract the shrinkage tendency of the cementitious system.

10. A cementitious composition which, when mixed with water, is capable of setting into a hard mass without substantial shrinkage during setting and hardening comprising a hydraulic cement mixture and sodium borohydride in an amount effective to generate gas under ordinary ambient temperature conditions without the addition of an activating agent to counteract the shrinkage tendency of the cementitious system.

* * * * *